No. 780,451. PATENTED JAN. 17, 1905.
R. STREHLAU.
TOOL SETTING DEVICE FOR MACHINE TOOLS.
APPLICATION FILED OCT. 21, 1903.
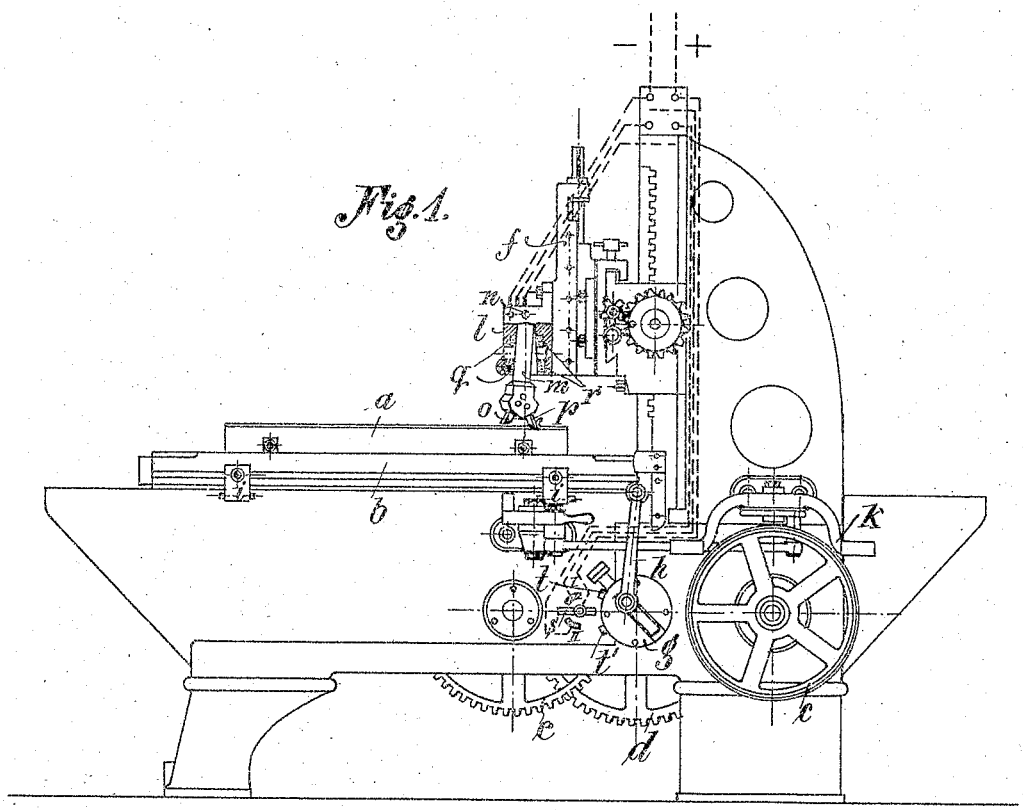
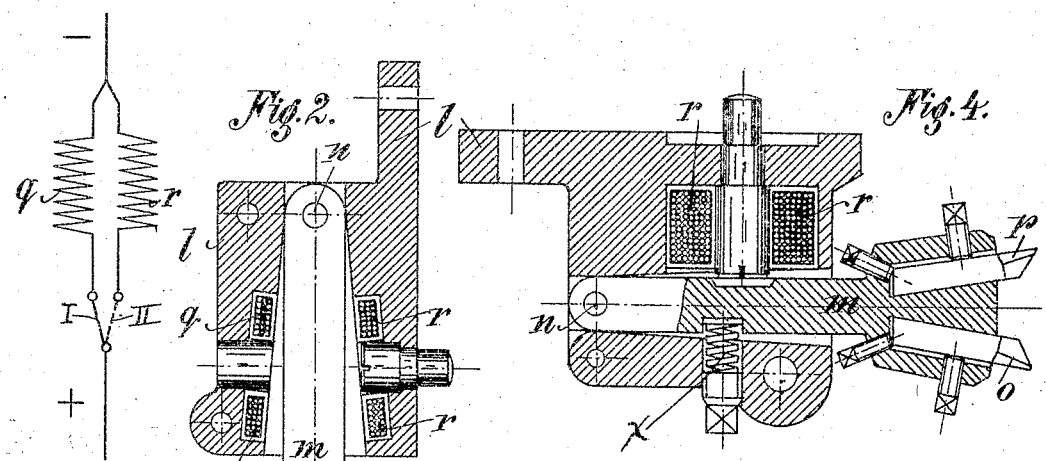
Witnesses:
Inventor.
Robert Strehlau,
by Wilkinson & Fisher,
Attorneys.

No. 780,451.

Patented January 17, 1905.

UNITED STATES PATENT OFFICE.

ROBERT STREHLAU, OF WESTEND, NEAR BERLIN, GERMANY.

TOOL-SETTING DEVICE FOR MACHINE-TOOLS.

SPECIFICATION forming part of Letters Patent No. 780,451, dated January 17, 1905.

Application filed October 21, 1903. Serial No. 177,981.

*To all whom it may concern:*

Be it known that I, ROBERT STREHLAU, engineer, a subject of the German Emperor, and a resident of Eschen-Allee 20, Westend, near Berlin, Germany, have invented new and useful Improvements in or Relating to Tool-Setting Devices for Machine-Tools, of which the following is a specification.

In machine-tools in which the work or the tool reciprocates—as, for instance, in planing or mortising machines—the tool does no work during the return movement, which means a certain loss. Attempts have been made to avoid the non-working return by causing the tool to work also during the return. Several constructions in which a tool with two cutting edges or several independent adjustable tools are automatically reversed are well known. Attempts have also been made to reverse single tools with one edge—that is to say, turn them through an angle of one hundred and eighty degrees after each operation, so that they should be again in working position for the return stroke. Such reversal requires, however, complicated devices necessitating very careful attendance. In the apparatus according to this invention such reversing is effected by electromagnetic devices. In this way a reliable and exact setting of tools is insured and all complicated mechanical connections or devices are done away with, such devices frequently interfering with the working of the machine, as has been proved in practice. The electromagnetic device, on the contrary, acts equally well in vertical, oblique, or horizontal position and can be attached to any machine-tool without necessitating any essential changes in the latter.

An apparatus according to this invention is illustrated, by way of example, in the accompanying drawings, in which it is shown applied to a planing-machine.

Figure 1 is a side elevation of a planing-machine provided with the apparatus according to this invention, the tool-holder casing being shown in section. Fig. 2 shows the tool-holder casing removed from the machine in section. Fig. 3 shows diagrammatically the electromagnets with their wire connections. Fig. 4 shows a modified construction of the tool-holder casing in section for mortising and other machines working vertically.

The work $a$ is placed on the slide $b$ of the planing-machine, which is caused to reciprocate in the well-known manner by belt-pulleys $c$, through intermediate toothed wheels $d$ and $e$, one of which engages with the rack of the slide. The horizontal feeding movement of the tool-holder $f$ is effected by the rocking slotted disk $g$ by means of a lever $h$. The reversing of the belt is effected in the well-known manner by means of stops $i$, which move the belt-shifter $k$ in a corresponding manner.

The parts just described are well known for all planing-machines and do not form part of this invention, which relates to the following device:

In the tool-holder casing $l$ the tool-holder $m$ is pivoted about a pin $n$. The holder $m$ is provided with tools $o$ and $p$, directed in opposite directions, but having their cutting edges in the same horizontal plane, said tools being adjustable in their holders in the well-known manner. In front and at the back of the tool-holder are arranged in the casing two electromagnets $q$ and $r$, which as soon as one of them is excited attracts the tool-holder $m$. When the latter has been attracted by one of the electromagnets, the edge of one of the tools comes into its lowest working position. Thus, for instance, if the electromagnet $q$ in Fig. 2 is excited the tool-holder will be attracted toward the left against the face of the casing $l$ and the tool $p$ will come into its lowest position, and thus become operative. If, on the contrary, the electromagnet $r$ is excited, the tool-holder will be attracted toward the right and the tool $o$ becomes operative. The electromagnets are placed in a circuit diagrammatically shown in Fig. 3. In the circuit are arranged two contacts I and II, Fig. 1, with which a switch-lever $s$ alternately comes in contact. This switch-lever is operated by the already-mentioned feed-disk $g$ effecting the horizontal feed of the tool-holder—namely, by means of the stops $t$ and $t'$, which as the disk rotates alternately move the switch-lever $s$ in contact with the parts I and II, in accordance with the movement of the planing-table $b$, and thus alternately excite the electromagnets $q$ and $r$.

Instead of being operated by the rocking disk $g$ the switch-lever could be controlled by any other moving part of the machine. From the contacts I and II corresponding wires lead to the magnets $q$ and $r$, one common return-wire leading to the switch-lever.

In mortising and other machines in which the working movement takes place in a vertical direction only one coil is required, as the reversing of the tool can be effected by gravity owing to the weight of the tool-holder, Fig. 4. The tools can be set independently of each other—say one tool for rough planing during the advance and the other one for smooth planing during the return. Owing to the non-working tool being held over the work by the electromagnet in such manner that it does not touch it, an additional advantage is obtained that the edge of it does not unnecessarily wear out, which is of great importance in practice. It is sometimes desirable in this modification to use a spring, such as $x$, to aid the magnet in lifting the tool-carrier $m$.

Having now particularly described and ascertained the nature of my invention, I declare that what I claim is—

1. The combination of a main support, a tool-holder support provided with a central recess pivotally attached to said main support and angularly adjustable thereon, a tool-holder provided with two sets of tools set in reverse directions pivoted in said recess, the arm of the tool-holder being adapted to swing against the side of the recess in said support which thereby forms a solid backing for said tool-holder, magnets located in the wall of said support, one on either side of said tool-holder, and means for energizing one of said magnets, and deënergizing the other, at each end of each stroke, substantially as described.

2. The combination of a main support, a tool-holder support provided with a long recess pivotally attached to said main support and angularly adjustable thereon, a tool-holder pivoted in said support and adapted to swing against the walls of said recess, thereby causing said support to furnish a solid backing for said tool-holder, said tool-holder being provided with two sets of tools set therein in reverse directions, two magnets located in the walls of said support on the opposite sides of said tool-holder respectively, switches arranged on the frame of the machine, and a movable work-support adapted to operate said switches at the end of its forward and rearward movements successively, thereby alternately energizing and deënergizing said magnets, substantially as described.

In testimony whereof I have signed my name to this specification in the presence of two subscribing witnesses.

ROBERT STREHLAU.

Witnesses:
 HENRY HASPER,
 WOLDEMAR HAUPT.